Sept. 24, 1935.    E. EPPLER    2,015,397

MIXING AND KNEADING MACHINE

Filed Feb. 6, 1935

INVENTOR
EUGEN EPPLER
BY
ATTORNEY

Patented Sept. 24, 1935

2,015,397

UNITED STATES PATENT OFFICE 2,015,397

MIXING AND KNEADING MACHINE

Eugen Eppler, Stuttgart, Germany, assignor to Baker Perkins Company, Inc., Saginaw, Mich., a corporation of New York Application February 6, 1935, Serial No. 5,175
In Germany June 22, 1934

2 Claims. (Cl. 259—85)

This invention relates to mixing and kneading machines of the revolving bowl type having stationary arms for scraping, kneading and material-turning.

The objects of the present improvement are to adapt mixing machines of that type to the kneading of numerous materials for which previously they were not adapted; to improve the product of the machine and reduce the time required for completing the mixing operation; to eliminate the forming of lumps or else destroy them as soon as they are formed; to prevent heavy masses from setting or becoming hard; to facilitate emptying and cleaning the mixing bowl and its associated parts; and to simplify the structure and arrangement of the working parts within the bowl.

The means by which this invention has solved the problems presented is the provision in the trough of such a rotatable mixing bowl, of an auxiliary kneader in the form of a freely rollable weight, such as a heavy ball, means in the bowl for halting the ball and keeping it from following the circular movement of the trough while permitting the ball to be raised and lowered therein by the action of the material being worked without preventing its turning on its own axis, and means located in the bowl for guiding the ball so as to keep it in the revolving trough.

With these and other objects in view the invention resides in the arrangement and combination of parts for carrying out the correlated functions and in the particular construction of the parts hereinafter described and claimed. It is to be understood that the embodiment herein shown is merely illustrative and that various changes in the form, proportions, size and minor details of construction, within the scope of the claims, may be resorted to without departing from the spirit of the invention.

Figure 1:
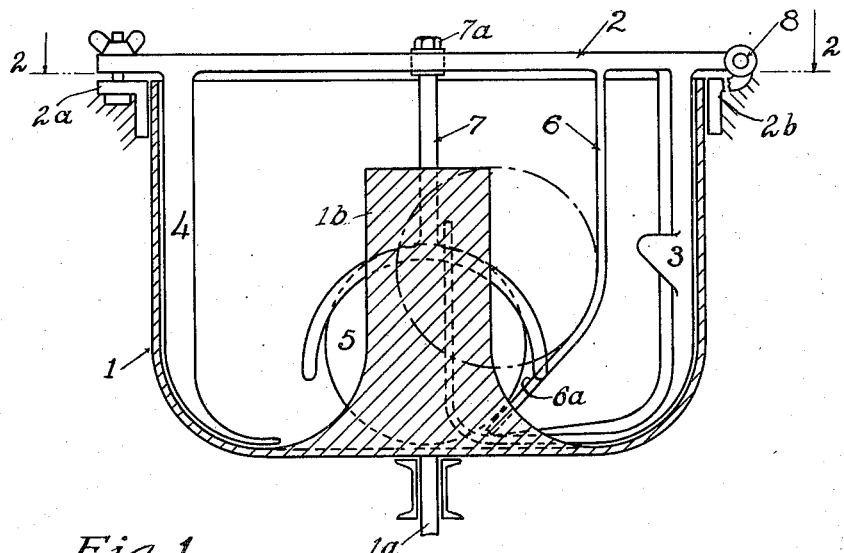

In the drawing Fig. 1 is a side view, partly in section, of a mixing machine embodying my invention.

Figure 2:
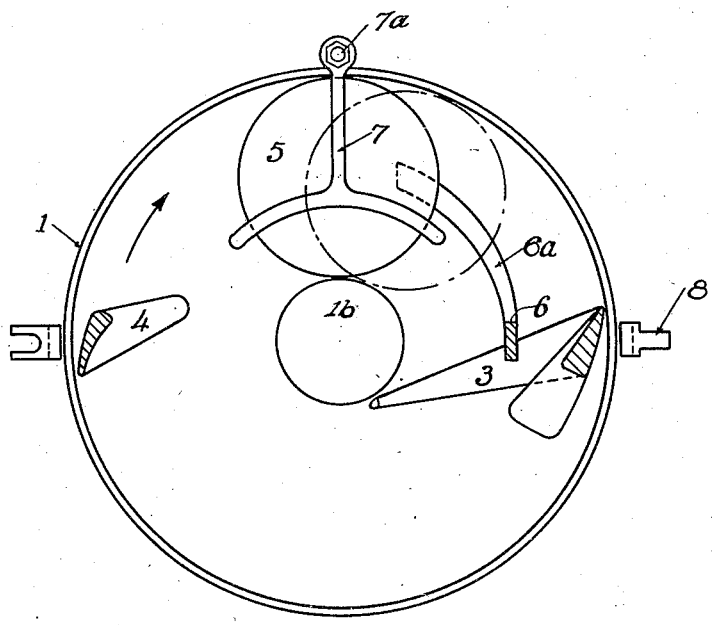

Fig. 2 is a part sectional plan view, the section being taken on line 2—2 of Fig. 1.

In the drawing, numeral 1 designates the annular trough of a mixing bowl to which my invention is adapted to be applied. The bowl is rotatable on a vertical shaft 1a. Above the bowl is a nonrotatable cross bar 2, mounted on fixed supports, 2a, 2b. One end of bar 2 may be hinged to its support as indicated at 8. The bar 2 carries the usual arm 4 for turning the material, and a conventional scraping and kneading arm 3, both extending downwardly into the bowl and into its trough 1.

The present invention is applied to such a mixer by providing an additional member 6, 6a, termed a stop arm or stop fork, and an appropriately ponderous freely rollable body, such as a ball 5 in the trough 1, the ball being adapted to co-operate with the stop arm in a manner to produce the advantageous results pointed out in the statement of the objects of the invention.

The stop arm 6, 6a is in the revolvable trough, but does not travel when the trough rotates, being carried by any suitable fixed support, such as the bar 2. The lower tip of the stop arm is positioned as shown, close to the bottom of the trough. The stop arm is shaped to present a working face 6a that extends in a curve along the direction of rotation of the trough, and also extends upwardly somewhat like a helical ramp. At the upper end of its inclined or ramp portion the stop arm is curved to present an upright bracket member 6 which is held in fixed position during the working of the machine. The ball 5 lies in trough 1 and is rollable and rotatable therein. Its diameter is preferably slightly less than the width of the trough, as indicated in Fig. 2. The ball is normally free to move upward and downward in the trough, and the rotatable bowl is formed with an upwardly projecting central mandrel 1b to keep the bll, during its rising and falling movements, in alinement with the trough.

The ball 5 and the working face 6a of the stop arm co-operate in the following manner. The bowl having been charged with material and rotating in the direction of the arrow, Fig. 2, ball 5 is put in motion by the movement of the material and upon coming into contact with the ramp-like working face 6a of the stop arm moves upward and downward on this inclined face between positions such as are indicated by the broken line circle and the full line circle.

The effect produced by the ball on the material is especially advantageous because the milling, rolling, grinding, kneading and pounding actions of the ball in the trough prevent formation of lumps in the mass and greatly hasten the completion of the mixing operation.

The working face 6a of the stop arm prevents the ball from traveling further with the trough and compels the ball to execute rotary movements of its own.

After having been acted upon by the ball in the manner described the material is carried around to the turning arm 4, which directs the mass toward the middle of the trough, thus again exposing the material fully to the action of the ball.

The parts 3, 4 and 6, mounted on bar 2 as shown in Fig. 1, can be conveniently removed from the bowl for cleaning by lifting the bar about its hinge 8, but any other known devices may be employed to support those parts without departing from the scope of the invention as defined in the claims.

The bowl itself can be tilted and upturned for emptying and cleaning, and the ball can be retained in the trough by means of a suitably formed arm 7, adapted to be fastened to the bowl by a clamp 7a. When the mixer is in operation the arm 7 is removed from the trough.

Having thus described my invention, what I claim and desire to secure by Letters Patent is:

1. In a mixing machine including a rotatable bowl with an annular trough having therein stationary arms for scraping, kneading and turning the material being worked, in combination, a centrally disposed upright guiding mandrel in said bowl, a weighted freely rotatable member movable up and down in said trough adjacent said mandrel, a stop arm projecting into the trough, the lower part of said arm presenting a rearwardly and upwardly directed face adapted to be engaged by said weighted member during the rotation of the bowl.

2. A structure as set forth in claim 1 having a bar extending across the top of the bowl, said arms for scraping, kneading and turning, and said stop arm being fixed to said bar, and fixed supports for the ends of said bar, one of said ends being hinged, for the purposes set forth.

EUGEN EPPLER.